United States Patent
Cook et al.

(10) Patent No.: US 10,694,200 B2
(45) Date of Patent: Jun. 23, 2020

(54) SYSTEM AND METHOD FOR LIGHTWEIGHT HIGH QUALITY IMAGE COMPRESSION FOR DISPLAY SCREENS

(71) Applicant: Samsung Display Co., Ltd., Yongin-si, Gyeonggi-do (KR)

(72) Inventors: Gregory W. Cook, San Jose, CA (US); Ning Lu, Saratoga, CA (US); Keshun Hu, Cupertino, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 175 days.

(21) Appl. No.: 15/452,650

(22) Filed: Mar. 7, 2017

(65) Prior Publication Data
US 2018/0213244 A1    Jul. 26, 2018

Related U.S. Application Data

(60) Provisional application No. 62/449,545, filed on Jan. 23, 2017.

(51) Int. Cl.
| | |
|---|---|
| *H04N 19/426* | (2014.01) |
| *H04N 19/136* | (2014.01) |
| *H04N 19/124* | (2014.01) |
| *H04N 19/186* | (2014.01) |
| *H04N 19/137* | (2014.01) |
| *H04N 19/593* | (2014.01) |
| *H04N 19/182* | (2014.01) |

(Continued)

(52) U.S. Cl.
CPC .......... *H04N 19/426* (2014.11); *H04N 19/12* (2014.11); *H04N 19/124* (2014.11); *H04N 19/13* (2014.11); *H04N 19/136* (2014.11); *H04N 19/137* (2014.11); *H04N 19/169* (2014.11); *H04N 19/182* (2014.11); *H04N 19/186* (2014.11); *H04N 19/593* (2014.11)

(58) Field of Classification Search
None
See application file for complete search history.

(56) References Cited

U.S. PATENT DOCUMENTS

| | | | |
|---|---|---|---|
| 4,661,862 A * | 4/1987 | Thompson | H04N 11/046 386/328 |
| 5,708,511 A | 1/1998 | Gandhi et al. | |

(Continued)

OTHER PUBLICATIONS

Ding, Jun-Ren et al., "Two-layer and Adaptive Entropy Coding Algorithms for H.264-based Lossless Image Coding", 2008 IEEE International Conference on Acoustics, Speech and Signal Processing (2008), pp. 1369-1372.

(Continued)

*Primary Examiner* — Lindsay J Uhl
(74) *Attorney, Agent, or Firm* — Lewis Roca Rothgerber Christie LLP

(57) ABSTRACT

A system and method for compressing video data. When a triplet of data values corresponding to a pixel differs sufficiently little from a previous, reference triplet, the difference is encoded using one of several encoding functions selected according to which of several criteria of similarity between the current triplet and the reference triplet is met. When none of the available criteria of similarity is met, the triplet is instead encoded using differential pulse code modulation with non-uniform quantization.

20 Claims, 8 Drawing Sheets

(51) Int. Cl.
  *H04N 19/13*   (2014.01)
  *H04N 19/12*   (2014.01)
  *H04N 19/169*  (2014.01)

(56) References Cited

U.S. PATENT DOCUMENTS

| | | |
|---|---|---|
| 6,246,345 B1 * | 6/2001 | Davidson ............ G10L 19/0208 |
| | | 341/51 |
| 6,285,796 B1 | 9/2001 | Acharya et al. |
| 6,396,422 B1 | 5/2002 | Barkan |
| 6,529,633 B1 | 3/2003 | Easwar et al. |
| 6,567,559 B1 | 5/2003 | Easwar et al. |
| 7,570,819 B2 | 8/2009 | Sung et al. |
| 7,742,521 B2 | 6/2010 | Vitali et al. |
| 8,208,545 B2 | 6/2012 | Seo et al. |
| 8,295,342 B2 | 10/2012 | Chen et al. |
| 8,428,381 B2 | 4/2013 | Chan et al. |
| 8,509,553 B2 | 8/2013 | Ding |
| 8,942,490 B2 | 1/2015 | Lan et al. |
| 9,509,992 B2 | 11/2016 | Komi et al. |
| 2009/0016624 A1 | 1/2009 | Sung et al. |
| 2009/0279800 A1 | 11/2009 | Uetani et al. |
| 2011/0103467 A1 * | 5/2011 | Wedi ...................... H04N 19/61 |
| | | 375/240.03 |
| 2015/0264376 A1 * | 9/2015 | Zou ...................... H04N 19/463 |
| | | 375/240.03 |

OTHER PUBLICATIONS

Naccari, Matteo et al., "Improving Inter Prediction in HEVC with Residual DPCM for Lossless Screen Content Coding", 2013 IEEE Picture Coding Symposium (PCS) (2013), pp. 361-364.

* cited by examiner

| Codespace: 65536 | | Reconstructed Pixels back | |
|---|---|---|---|
| | Exact | 7-16 | 9 |
| 65526 | Component +/- 1 | 6 | 3 + 2 + 2 = 7 |
| 65519 | Component +/- 1 | 5 | 3 + 2 + 2 = 7 |
| 65512 | Pixel +/- 1 | 4 | 3 x 3 x3 = 27 |
| 65485 | Pixel +/- 1 | 3 | 3 x 3 x3 = 27 |
| 65458 | Pixel +/- 4 | 2 | 9 x 9 x 9 = 729 |
| 64729 | Pixel +/- 4 | 1 | 9 x 9 x 9 = 729 |
| 64000 | Arithmetic 40 | 0 | 40 x 40 x 40 = 64,000 |
| 0 | | | 0 |

SYSTEM AND METHOD FOR LIGHTWEIGHT HIGH QUALITY IMAGE COMPRESSION FOR DISPLAY SCREENS

CROSS-REFERENCE TO RELATED APPLICATION(S)

The present application claims priority to and the benefit of U.S. Provisional Application No. 62/449,545, filed Jan. 23, 2017, entitled "LIGHTWEIGHT HIGH QUALITY IMAGE COMPRESSION FOR DISPLAY SCREENS", the entire content of which is incorporated herein by reference.

FIELD

One or more aspects of embodiments according to the present invention relate to data encoding, and more particularly to a system and method for compressing video data.

BACKGROUND

The number of pixels in displays (e.g., liquid crystal displays (LCDs), and organic light emitting diode (OLED) displays) continue to grow from full high definition (full HD—1920×1080), to 4K (3840×2160) and 8K (7680× 4320)—a full 16 times the number of pixels of Full HD. This has put pressure on the transmission of the pixel values to the display (which may be referred to as the display stream).

Thus, there is a need for a system and method for compressing the display stream.

SUMMARY

Aspects of embodiments of the present disclosure are directed toward a system and method for compressing video data. When a triplet of data values corresponding to a pixel differs sufficiently little from a previous, reference triplet, the difference is encoded using one of several encoding functions selected according to which of several criteria of similarity between the current triplet and the reference triplet is met. When none of the available criteria of similarity is met, the triplet is instead encoded using differential pulse code modulation with non-uniform quantization.

According to an embodiment of the present invention there is provided a method for transmitting a sequence of triplets of raw data units corresponding to a sequence of pixels, the method including: transmitting the raw data units of a first plurality of triplets, the first plurality of triplets including the L triplets nearest the beginning of the sequence of triplets, L being a positive integer; and encoding a second plurality of triplets including triplets following the L triplets nearest the beginning of the sequence of triplets, to form a plurality of encoded data units, each of the encoded data units corresponding to a respective triplet of the second plurality of triplets, wherein the encoding includes: when any criterion of similarity, of a plurality of criteria of similarity, between: a current triplet of the second plurality of triplets and a reference triplet of the triplets preceding the current triplet is met: encoding the current triplet utilizing a difference function of the difference between the current triplet and the reference triplet, the difference function corresponding to the criterion of similarity, and otherwise: encoding a current triplet of the second plurality of triplets utilizing differential pulse code modulation with non-uniform quantization.

In one embodiment, a criterion of similarity of a first family of criteria of similarity of the plurality of criteria of similarity is met when the reference triplet is a triplet preceding the current triplet by X positions in the sequence and the reference triplet consists of three data units each of which differs by no more than M from the corresponding data unit of the current triplet, X and M being positive integers.

In one embodiment, for a first criterion of similarity, of the first family of criteria of similarity, $X=1$ and $M=4$.

In one embodiment, each of the current triplet and the reference triplet consists of a first data unit, a second data unit, and a third data unit, in the same respective order, and the difference function corresponding to the first criterion of similarity is: 81 D1+9 D2+D3+O1, wherein: D1 is the difference between: the first data unit of the current triplet and the first data unit of the reference triplet, D2 is the difference between: the second data unit of the current triplet and the second data unit of the reference triplet, D3 is the difference between: the third data unit of the current triplet and the third data unit of the reference triplet, and O1 is an offset, O1 being a positive integer.

In one embodiment, for a second criterion of similarity, of the first family of criteria of similarity, $X=2$ and $M=4$.

In one embodiment, for a third criterion of similarity, of the first family of criteria of similarity, $X=3$ and $M=1$.

In one embodiment, a criterion of similarity of a second family of criteria of similarity of the plurality of criteria of similarity is met when the reference triplet is a triplet preceding the current triplet by Y positions in the sequence and the reference triplet consists of three data units one of which differs by no more than P from the corresponding data unit of the current triplet, and each of two of which is equal to the respective corresponding data unit of the current triplet, Y and P being positive integers.

In one embodiment, for a first criterion of similarity, of the second family of criteria of similarity, $Y=5$ and $P=1$.

In one embodiment, each Y is greater than each X.

In one embodiment, a criterion of similarity of a third family of criteria of similarity of the plurality of criteria of similarity is met when the reference triplet is a triplet preceding the current triplet by Z positions in the sequence and the reference triplet consists of three data units each of which is equal to the respective corresponding data unit of the current triplet, Z being a positive integer.

In one embodiment, each Z is greater than each Y.

In one embodiment, the method includes a non-uniform quantizer to form three resulting data units; and combining the three resulting data units in an arithmetic encoder.

In one embodiment, the method includes a number of values equal to a positive-integer power of two.

In one embodiment, the method includes a number of values equal to a positive-integer power of two.

According to an embodiment of the present invention there is provided a system for transmitting a sequence of triplets of raw data units corresponding to a sequence of pixels, the system including a processing circuit configured to: transmit the raw data units of a first plurality of triplets, the first plurality of triplets including the L triplets nearest the beginning of the sequence of triplets, L being a positive integer; and encode a second plurality of triplets including triplets following the first L triplets, to form a plurality of encoded data units, each of the encoded data units corresponding to a respective triplet of the second plurality of triplets, wherein the encoding includes: when any criterion of similarity, of a plurality of criteria of similarity, between: a current triplet of the second plurality of triplets and a reference triplet of the triplets preceding the current triplet is met: encoding the current triplet utilizing a difference function of the difference between the current triplet and the reference triplet, the difference function corresponding to the criterion of similarity, and otherwise: encoding a current triplet of the second plurality of triplets utilizing differential pulse code modulation with non-uniform quantization.

In one embodiment, a criterion of similarity of a first family of criteria of similarity of the plurality of criteria of similarity is met when the reference triplet is a triplet preceding the current triplet by X positions in the sequence and the reference triplet consists of three data units each of which differs by no more than M from the corresponding data unit of the current triplet, X and M being positive integers.

In one embodiment, a criterion of similarity of a second family of criteria of similarity of the plurality of criteria of similarity is met when the reference triplet is a triplet preceding the current triplet by Y positions in the sequence and the reference triplet consists of three data units one of which differs by no more than P from the corresponding data unit of the current triplet, and each of two of which is equal to the respective corresponding data unit of the current triplet, Y and P being positive integers.

In one embodiment, a criterion of similarity of a third family of criteria of similarity of the plurality of criteria of similarity is met when the reference triplet is a triplet preceding the current triplet by Z positions in the sequence and the reference triplet consists of three data units each of which is equal to the respective corresponding data unit of the current triplet, Z being a positive integer.

In one embodiment, the system includes a non-uniform quantizer to form three resulting data units; and combining the three resulting data units in an arithmetic encoder.

According to an embodiment of the present invention there is provided a video system, including: a video source; and a display having an input connected to an output of the video source, the video source including a processing circuit configured to: transmit the raw data units of a first plurality of triplets, the first plurality of triplets including the L triplets nearest the beginning of the sequence of triplets, L being a positive integer; and encode a second plurality of triplets including triplets following the first L triplets, to form a plurality of encoded data units, each of the encoded data units corresponding to a respective triplet of the second plurality of triplets, wherein the encoding includes: when any criterion of similarity, of a plurality of criteria of similarity, between: a current triplet of the second plurality of triplets and a reference triplet of the triplets preceding the current triplet is met: encoding the current triplet utilizing a difference function of the difference between the current triplet and the reference triplet, the difference function corresponding to the criterion of similarity, and otherwise: encoding a current triplet of the second plurality of triplets utilizing differential pulse code modulation with non-uniform quantization.

BRIEF DESCRIPTION OF THE DRAWINGS

These and other features and advantages of the present invention will be appreciated and understood with reference to the specification, claims, and appended drawings wherein:

FIG. 7 is a codespace diagram, according to an embodiment of the present invention.

DETAILED DESCRIPTION

The detailed description set forth below in connection with the appended drawings is intended as a description of exemplary embodiments of a system and method for lightweight high quality image compression for display screens provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

In some embodiments, a sequence of pixels to be displayed as part of an image is represented as a corresponding sequence of triplets of data units. For example, a pixel may be represented as a triplet of bytes (i.e., it may be represented as three bytes), one for each of three respective intensities to be displayed in each of three colors, e.g., red, green and blue. In such an embodiment, 24 bits (3 bytes at 8 bits each) may be used to represent one pixel. As used herein, a data unit is an ordered set of bits used to represent a binary number. A byte is an example of a data unit, as is a 16-bit word.

Figure 1:
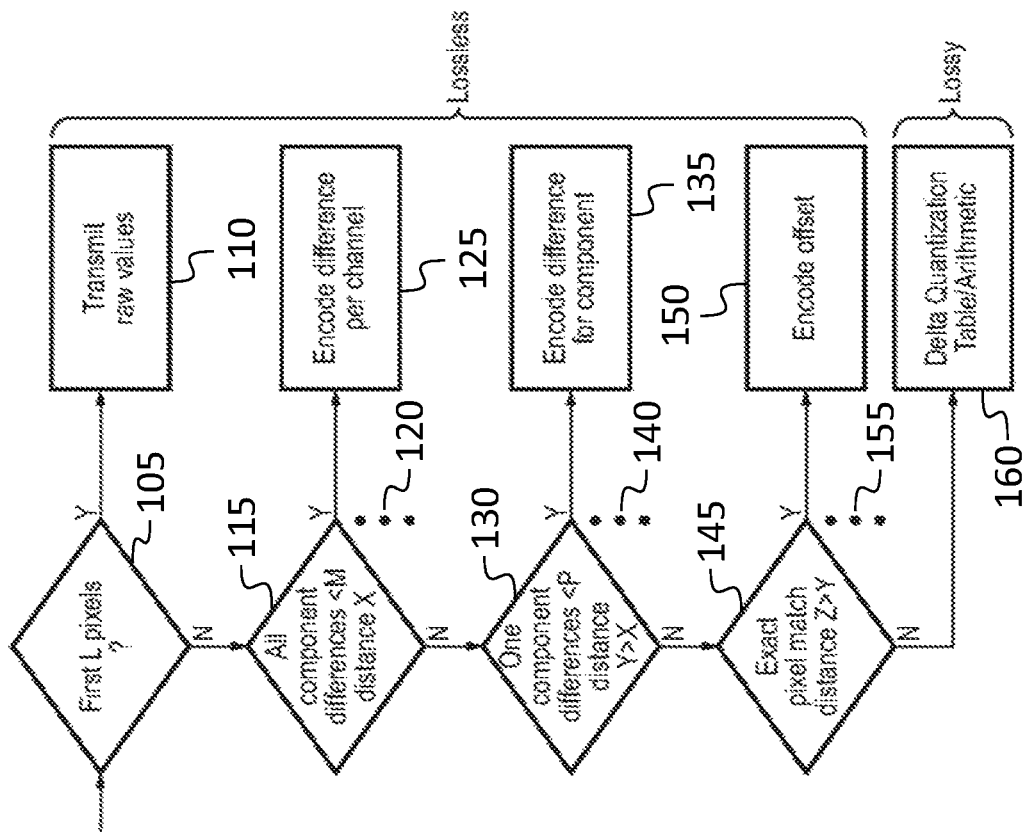
FIG. 1 is a flow chart of a method for compressing video data, according to an embodiment of the present invention.

Compressing data (e.g., video data) carrying pixel information may be useful for reducing the demands on a data link transmitting video data, e.g., to a display. Referring to FIG. 1, in some embodiments, each of the pixels in a first plurality of triplets nearest the beginning of a sequence of triplets is transmitted un-encoded (uncompressed), i.e., in its raw form, in acts 105 and 110. Each subsequent pixel is then encoded using either lossless or lossy encoding.

A triplet currently being encoded (referred to herein as the "current triplet") may be encoded using lossless encoding if it is sufficiently similar to a preceding triplet (referred to herein as a "reference triplet"). More specifically, lossless encoding may be used if any criterion of similarity, of a plurality of criteria of similarity, between the current triplet and a reference triplet, of the triplets preceding the current triplet, is met. Act 115 of FIG. 1 is an example of a test for one such criterion of similarity. In the act 115 the criterion of similarity is met when each data unit of the triplet that precedes the current triplet by one (i.e., each data unit of the immediately preceding triplet) differs in absolute value from the corresponding data unit of the current triplet by no more than M, where M is a positive integer. As used herein, the data unit of the current triplet corresponding to a data unit of the reference triplet is the data unit in the same position in the triplet and representing display intensity of the same color component (e.g., red, green, or blue). When a criterion of similarity (such as the one for which act 115 tests) is met, a function (or "difference function") of the difference between the current triplet and the reference triplet may be used to encode the current triplet, as discussed in further detail below. When a particular criterion of similarity is not met (e.g., if act 115 determines that the corresponding criterion of similarity is not met), then (as shown in FIG. 1) the method may test whether other criteria of similarity are met, and if any other criterion of similarity is met, a function of the difference between the current triplet and the reference triplet (the function corresponding to the criterion of similarity that is met) may be used to encode the current triplet.

The criterion of similarity for which act 115 tests may be considered more generally to be a member of a first family of criteria of similarity, that includes any criterion of similarity that is met when a triplet, preceding the current triplet by X positions in the sequence, consists of three data units each of which differs in absolute value by no more than M from the corresponding data unit of the current triplet, X and M both being positive integers, and the act 115 corresponding to X=1. The vertical ellipsis 120 represents a plurality of additional tests for other criteria of similarity of this family that may be employed. For example, in the embodiment illustrated in FIG. 7, and discussed in further detail below, four criteria of similarity from this family are used, with M=1 in two of them and M=4 in two others. In some embodiments, four criteria of similarity from this family of criteria of similarity are used, with:

X=1, M=4,
X=2, M=4,
X=3, M=1, and
X=4, M=1, respectively. One of skill in the art will understand that these parameters may be changed within the constraints of the codespace, as described in further detail below.

When any criterion of similarity of the first family of criteria of similarity are met, the triplet of differences formed by subtracting the current triplet from the reference triplet is encoded, in an act 125, using a corresponding function, as discussed in further detail below.

A second family of criteria of similarity may include any criterion of similarity that is met when the reference triplet is a triplet preceding the current triplet by Y positions in the sequence and the reference triplet consists of three data units one of which differs in absolute value by no more than P from the corresponding data unit of the current triplet, and each of two of which is equal to the respective corresponding data unit of the current triplet, Y and P being positive integers In the embodiment of FIG. 1, the act 130 is a test for whether a first criterion of similarity of the second family of criteria of similarity is met. If the criterion of similarity is met, then the triplet of differences formed by subtracting the current triplet from the reference triplet is encoded, in an act 135, as discussed in further detail below. A plurality of criteria of similarity, of the second family of criteria of similarity, may be used, each one being used for a different reference pixel of the pixels preceding the current pixel, as symbolized by the vertical ellipsis 140. In the embodiment of FIG. 1, Y is greater than X; in other embodiments criteria of similarity from various families of criteria of similarity may be applied in an arbitrary, different order, within the constraints of the codespace, as discussed in further detail below.

A third family of criteria of similarity may include any criterion of similarity that is met when a reference triplet equals the current triplet. In particular, the criterion of similarity is met when the reference triplet is a triplet preceding the current triplet by Z positions in the sequence and the reference triplet consists of three data units each of which is equal to the corresponding data unit of the current triplet, Z being a positive integer. In the embodiment of FIG. 1, the act 145 is a test for whether a first criterion of similarity of the third family of criteria of similarity is met. If the criterion of similarity is met, then the triplet of differences formed by subtracting the current triplet from the reference triplet is encoded, in an act 150, as discussed in further detail below. A plurality of criteria of similarity, of the third family of criteria of similarity, may be used, each one being used for a different reference pixel of the pixels preceding the current pixel, as symbolized by the vertical ellipsis 155.

When none of the criteria of similarity are met, lossy differential pulse code modulation with non-uniform quantization may be used to encode the current triplet. Here the differential values are taken using modulo arithmetic. For A defined as the number of bits per component, a maximum quantization error+/−M, modulo arithmetic must be $2^A+2M$. M may be selected to be the same value as the criterion of similarity for which act 115 tests. By using modulo arithmetic the difference values do not need to be extended by one bit, which saves having to account for this extra bit in the quantization.

All additions/subtractions are done using modulo arithmetic $$a \equiv c (\bmod\ m) \text{ iff}$$

there exists an integer k such that a−c=mk
C is called the residue of a if 0≤c<m
Theorem 1: If $$a \equiv c (\bmod\ m)$$

$$b \equiv d (\bmod\ m)$$

$$a+b \equiv c+d (\bmod\ m)$$

$$a-b \equiv c-d (\bmod\ m)$$

Now let $0 \leq a_i < m$, i>0

$$x_i \equiv a_1 - x_{i-1} (\bmod\ m)$$

If $y_i \equiv x_i + x_{i-1} (\bmod\ m)$

Then by Theorem 1:

$$y_i \equiv a_i (\bmod\ m)$$

Since $0 \leq a_i < m$, then $a_i$ is the residue of $y_i$, and the recovered value $\acute{y}_\iota = a_i$ Now suppose a quantizer q produces an error ε which is a function of the difference between $a_i$ and $x_{i-1}$, and has a maximum error $|\varepsilon| \leq \acute{\varepsilon}$.

$$x_i \equiv a_i - x_{i-1} + \varepsilon(a_i - x_{i-1}) (\bmod\ m)$$

$$x_i \equiv a_i - x_{i-1} + \varepsilon(a_i - x_{i-1}) (\bmod\ m)$$

Then $y_i \equiv a_i + \varepsilon(a_1 - x_{i-1}) (\bmod\ m)$ $$y_i \equiv a_i + \varepsilon(a_i - x_{i-1}) (\bmod\ m)$$

Since the right hand side is not a residue, we cannot recover $$\acute{y}_\iota = a_i + \varepsilon(a_i - x_{i-1})$$

However, if $$x_i \equiv a_i - x_{i-1} + \varepsilon(a_i - x_{i-1}) + \acute{\varepsilon} (\bmod\ m + 2\acute{\varepsilon})$$

$x_i \equiv a_i - x_{i-1} + \varepsilon(a_i - x_{i-1}) + \hat{\varepsilon} \pmod{m+2\hat{\varepsilon}}$ Then the residue of $y_i$ is $a_1 + \varepsilon(a_i - x_{i-1}) + \hat{\varepsilon}$ and then we define the recovered value:

$\acute{y}_i = \max(\min(0, a_i + \varepsilon(a_i - x_{i-1}), m-1)$

In the design of the non-linear quantizer, the number of levels of output R is based on A and B, the number of bits per pixel. (The compression ratio is 3A/B.) The formula which defines this relationship is the maximum R such that $R^3 < 2^B$. B may not be selected completely arbitrarily, as M (the maximum difference described above) may not be able to be satisfied in the quantizer design if B (and thus R) is too low.

Figure 2:
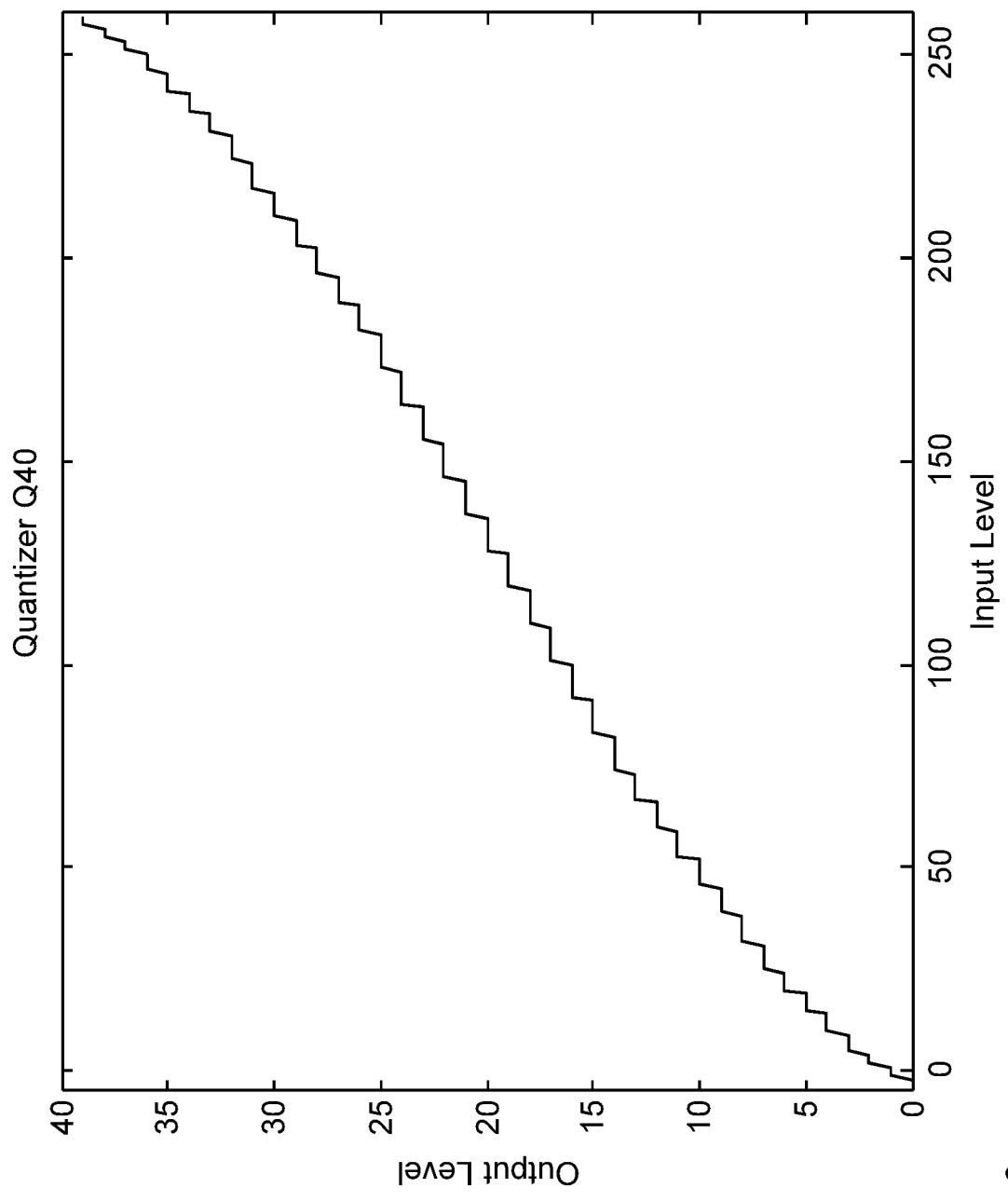
FIG. 2 is a graph of a quantizer mapping, according to an embodiment of the present invention.
Figure 3:
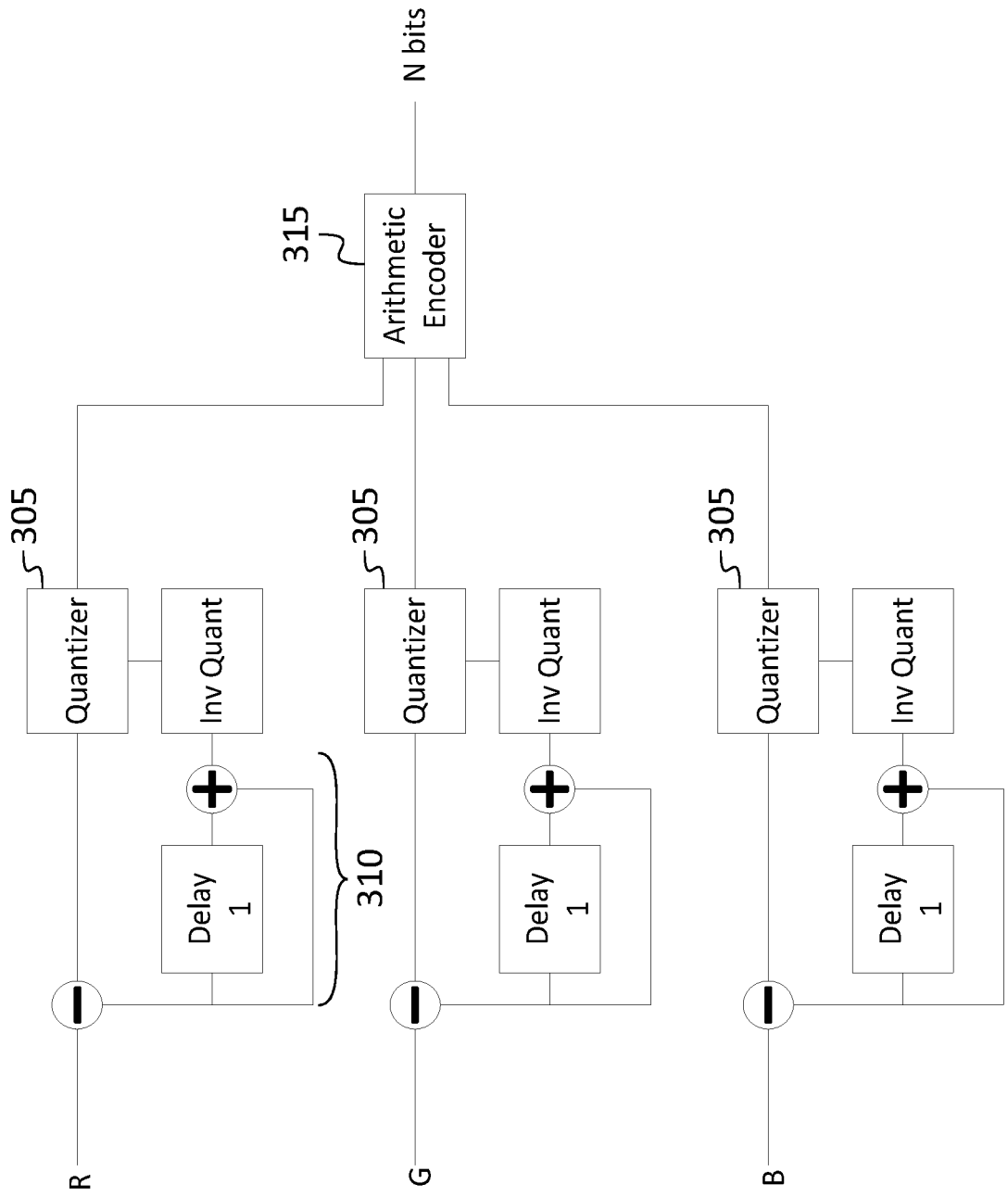
FIG. 3 is a block diagram of a portion of a system for compressing video data, according to an embodiment of the present invention.

For example for A=8, B=16, R=40, M=4, the mapping shown in Table 1 and illustrated in FIG. 2 may be used as the quantizer 305, in each of the three differential pulse code modulation encoders of the circuit of FIG. 3, to map the difference between a data unit of the current triplet and the output of the respective integrator 310 into a number between 0 and 39. The outputs of the three differential pulse code modulation encoders are then combined in an arithmetic encoder 315 which may calculate the output as $E = R(RX1+X2)+X3$ where X1, X2, and X3 are the respective values of the outputs of the three differential pulse code modulation encoders and E is the output of the arithmetic encoder. As used herein, an "encoder" is a circuit that transforms an input data stream into an output data stream; accordingly, an encoder may include one or more other encoders. For example, the circuit of FIG. 3 is an encoder including a plurality of encoders, each of the differential pulse code modulation encoders being an encoder and the arithmetic encoder also being an encoder.

TABLE 1

0: −4, −3, −2
1: −1, 0, 1
2: 2, 3, 4
3: 5, 6, 7, 8, 9
4: 10, 11, 12, 13, 14
5: 15, 16, 17, 18, 19
6: 20, 21, 22, 23, 24
7: 25, 26, 27, 28, 29, 30, 31
8: 32, 33, 34, 35, 36, 37, 38
9: 39, 40, 41, 42, 43, 44, 45
10: 46, 47, 48, 49, 50, 51, 52
11: 53, 54, 55, 56, 57, 58, 59
12: 60, 61, 62, 63, 64, 65, 66
13: 67, 68, 69, 70, 71, 72, 73
14: 74, 75, 76, 77, 78, 79, 80, 81, 82
15: 83, 84, 85, 86, 87, 88, 89, 90, 91
16: 92, 93, 94, 95, 96, 97, 98, 99, 100
17: 101, 102, 103, 104, 105, 106, 107, 108, 109
18: 110, 111, 112, 113, 114, 115, 116, 117, 118
19: 119, 120, 121, 122, 123, 124, 125, 126, 127
20: 128, 129, 130, 131, 132, 133, 134, 135, 136
21: 137, 138, 139, 140, 141, 142, 143, 144, 145
22: 146, 147, 148, 149, 150, 151, 152, 153, 154
23: 155, 156, 157, 158, 159, 160, 161, 162, 163
24: 164, 165, 166, 167, 168, 169, 170, 171, 172
25: 173, 174, 175, 176, 177, 178, 179, 180, 181
26: 182, 183, 184, 185, 186, 187, 188
27: 189, 190, 191, 192, 193, 194, 195
28: 196, 197, 198, 199, 200, 201, 202
29: 203, 204, 205, 206, 207, 208, 209
30: 210, 211, 212, 213, 214, 215, 216
31: 217, 218, 219, 220, 221, 222, 223
32: 224, 225, 226, 227, 228, 229, 230
33: 231, 232, 233, 234, 235
34: 236, 237, 238, 239, 240
35: 241, 242, 243, 244, 245

TABLE 1-continued

36: 246, 247, 248, 249, 250
37: 251, 252, 253
38: 254, 255, 256
39: 257, 258, 259

Figure 4:
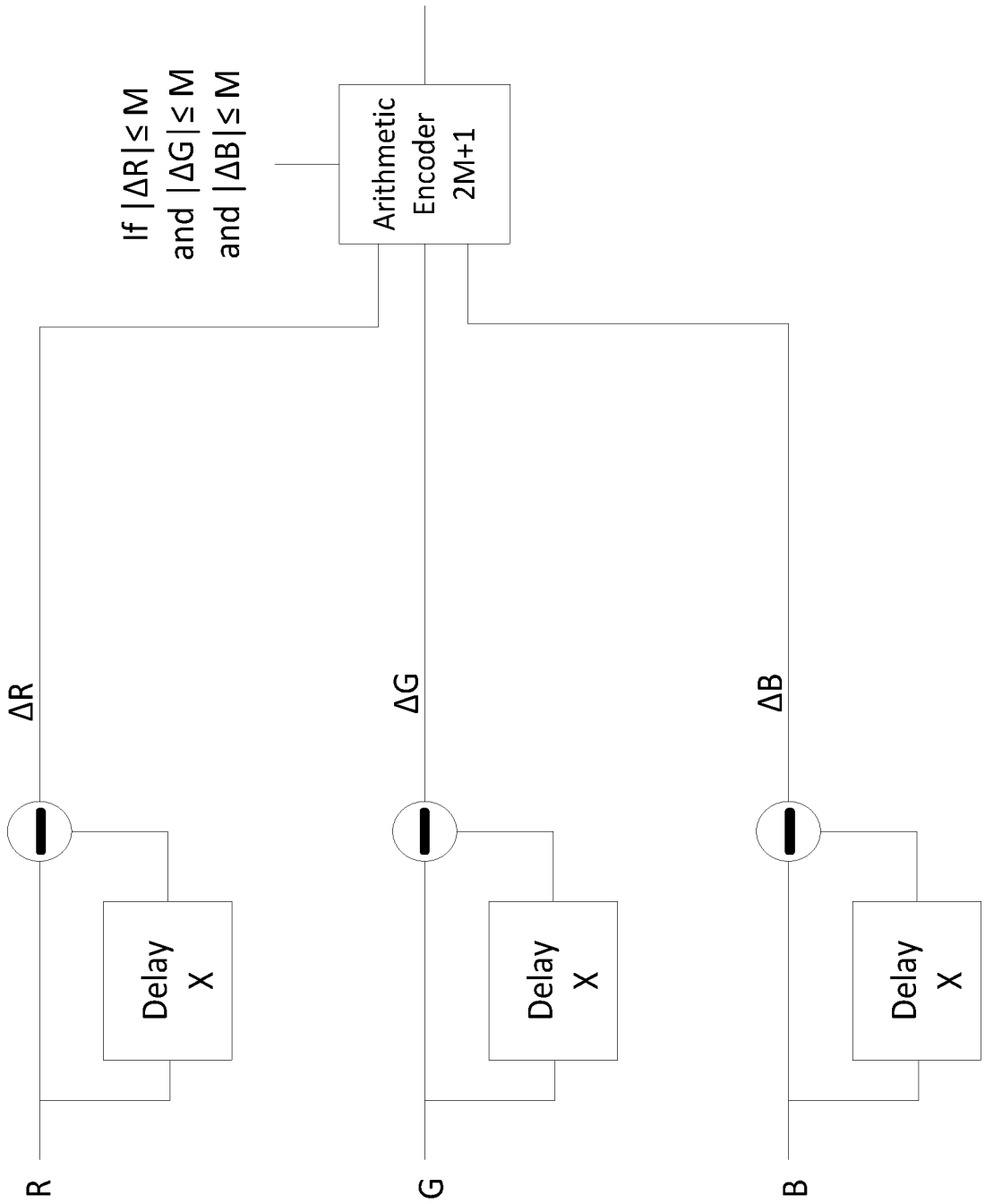
FIG. 4 is a block diagram of a portion of a system for compressing video data, according to an embodiment of the present invention.

FIG. 4 shows a block diagram for implementing a criterion of similarity of the first family of criteria of similarity. Each data unit of the triplet of data units is subtracted from a previous data unit (delayed by X positions); if the magnitudes of all three of the differences are less than or equal to M, then the three differences are encoded using an arithmetic encoder. The output E1 of the arithmetic encoder may be, for example:

$E1=(2M+1)((2M+1)D1+D2)+D3+O1$ where D1 is the difference between the first data unit of the current triplet and the first data unit of the reference triplet, D2 is the difference between the second data unit of the current triplet and the second data unit of the reference triple, D3 is the difference between the third data unit of the current triplet and the third data unit of the reference triplet, and O1 is an offset. For example, for M=4, E1=81 D1+9 D2+D3+O1. The offset O1 may be selected so that the range of output values of the encoder falls within a selected range of the codespace, as discussed in further detail below.

Figure 5:
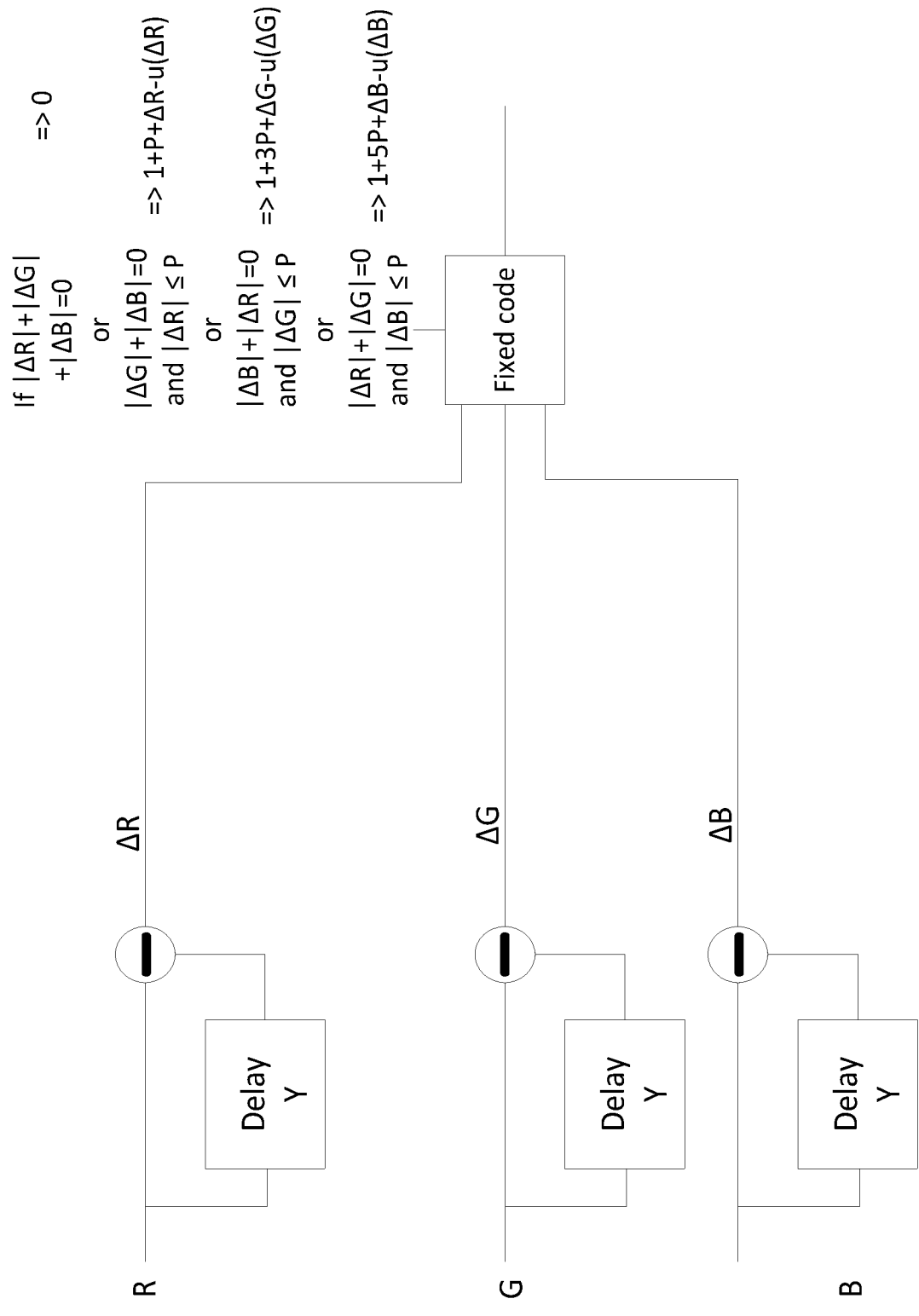
FIG. 5 is a block diagram of a portion of a system for compressing video data, according to an embodiment of the present invention.

FIG. 5 shows a block diagram for implementing a criterion of similarity of the second family of criteria of similarity. Each data unit of the triplet of data units is subtracted from a previous data unit (delayed by Y positions); if the magnitude of one of the differences is less than P and one of which differs by no more than P from a corresponding data unit of the current triplet, and each of two of which is equal to a corresponding data unit of the current triplet, then the three differences are encoded using an arithmetic encoder. The output E2 of the arithmetic encoder may be, for example:

when D2=0 and D3=0: E2=1+P+D1−u(D1)+O2
when D1=0 and D3=0: E2=1+3P+D2−u(D2)+O2
when D1=0 and D2=0: E2=1+5P+D3−u(D3)+O2.

where O2 is an offset, and u(D) is the unit step function, where if D<0 the value is 0, otherwise 1. Similar to the above, the offset O2 may be selected so that the range of output values of the encoder falls within a selected range of the codespace, as discussed in further detail below.

Figure 6:
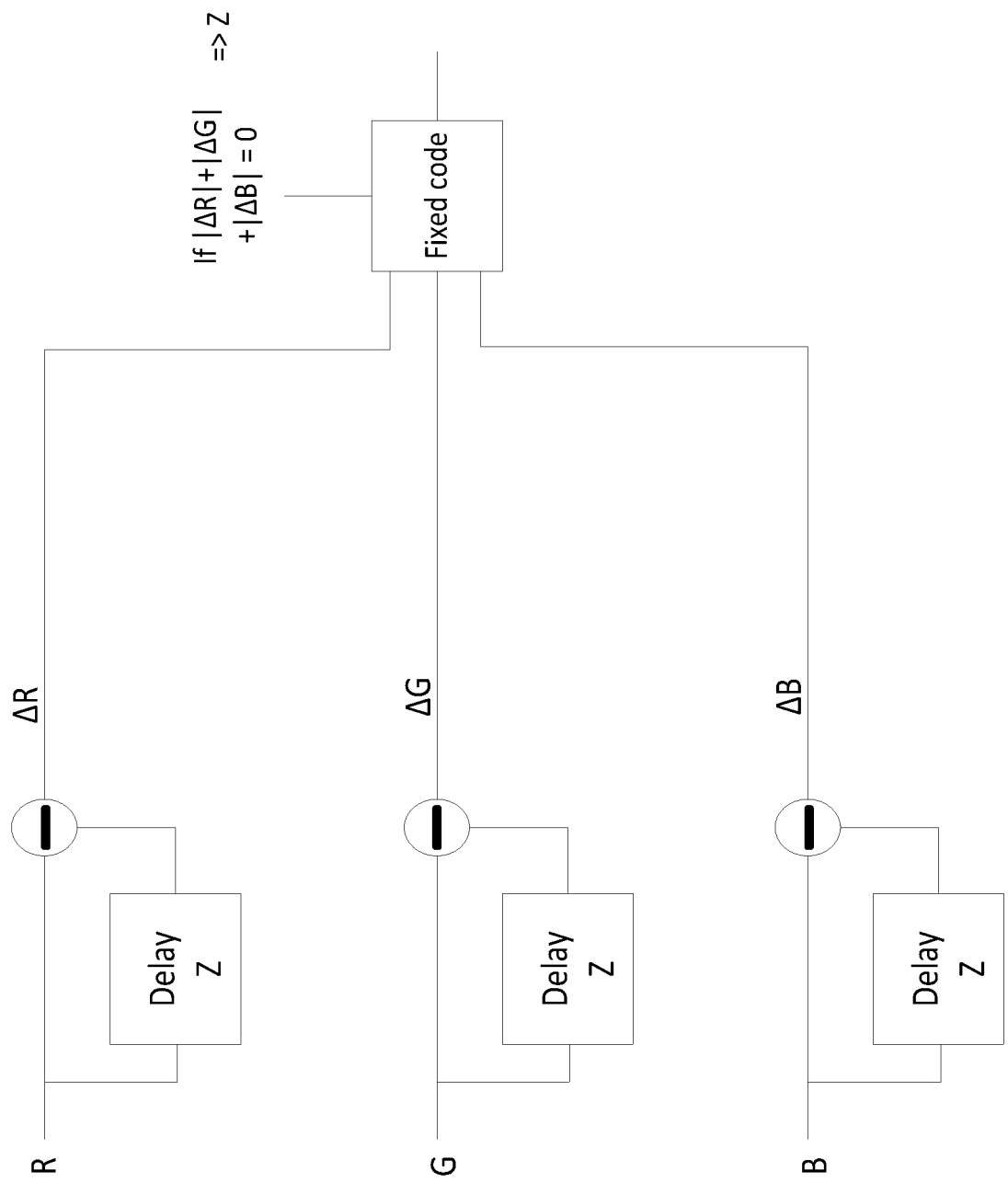
FIG. 6 is a block diagram of a portion of a system for compressing video data, according to an embodiment of the present invention.

FIG. 6 shows a block diagram for implementing a criterion of similarity of the third family of criteria of similarity. Each data unit of the triplet of data units is subtracted from a previous data unit (delayed by Z positions); if all of the differences are zero, then the output of the encoder is the constant Z. In operation, for each triplet to be encoded (i.e., for each pixel value) the output of one of the encoders (of FIGS. 3-6) is selected in accordance with the decision tree of FIG. 1.

FIG. 7 shows a codespace (not drawn to scale) according to one embodiment, illustrating the manner in which the outputs of the encoders may be configured to take, in various respective circumstances, each of the values, between 0 and 65535, capable of being represented by a 16-bit binary number. In the embodiment of FIG. 7, if none of the plurality of criteria of similarity is met by the current pixel, then differential pulse code modulation with non-uniform quantization is used to encode the current triplet, to form a number between 0 and 63,999, inclusive.

An adjacent range of values, the range between 64,000 and 64,728, inclusive, is allocated to a first criterion of similarity. This criterion of similarity is a member of the first family of criteria of similarity, with X=1 (i.e., the reference triplet is the immediately previous triplet) and M=4. Because there are 729 ways the current triplet can differ from the previous triplet subject to the constraint that each data unit of the current pixel differs by at most 4 from the corresponding data unit of the reference pixel, the 729 next values of the codespace are reserved to signal that this criterion of similarity was met, and to indicate what the three respective differences were. This may accomplished by adding, to the output of the encoder for the circuit triggered when this criterion of similarity is met, a suitable offset, so that the sum of the encoder output and the offset is in the range between 64,000 and 64,728, inclusive, when this criterion of similarity is met.

In a similar manner, in the embodiment of FIG. 7, the next criterion of similarity is a member of the first family of criteria of similarity, with X=2 and M=4, and an offset is used so that the sum of the encoder output and the offset is in the range between 64,729 and 65,457, inclusive, when this criterion of similarity is met. Criteria of similarity with X=3 and M=1 and with X=4 and M=1 are used, in a similar manner, in the ranges between 65,458 and 65,484, and between 65,485 and 65,511, respectively.

Ranges between 65,512 and 65,518, and between 65,519 and 65,525, are used for criteria of similarity from the second family of criteria of similarity, with Y=5 and P=1 and with Y=6 and P=1, respectively. The remainder of the codespace, i.e., the range from 65,526 to 65,535, is then used for criteria of similarity from the third family of criteria of similarity, with Z in the range 7-16, inclusive.

In other embodiments, a different codespace is used, e.g. using more or fewer than 16 bits to encode each triplet. In a manner analogous to that of FIG. 7, various lossy compression and lossless compression methods (each of the latter corresponding to a respective criterion of similarity) may be combined to make use of the values available within the codespace. In some embodiments, all of the values available within the codespace are used, or most of the values (e.g., 99% of the values) available within the codespace are used.

Figure 8:
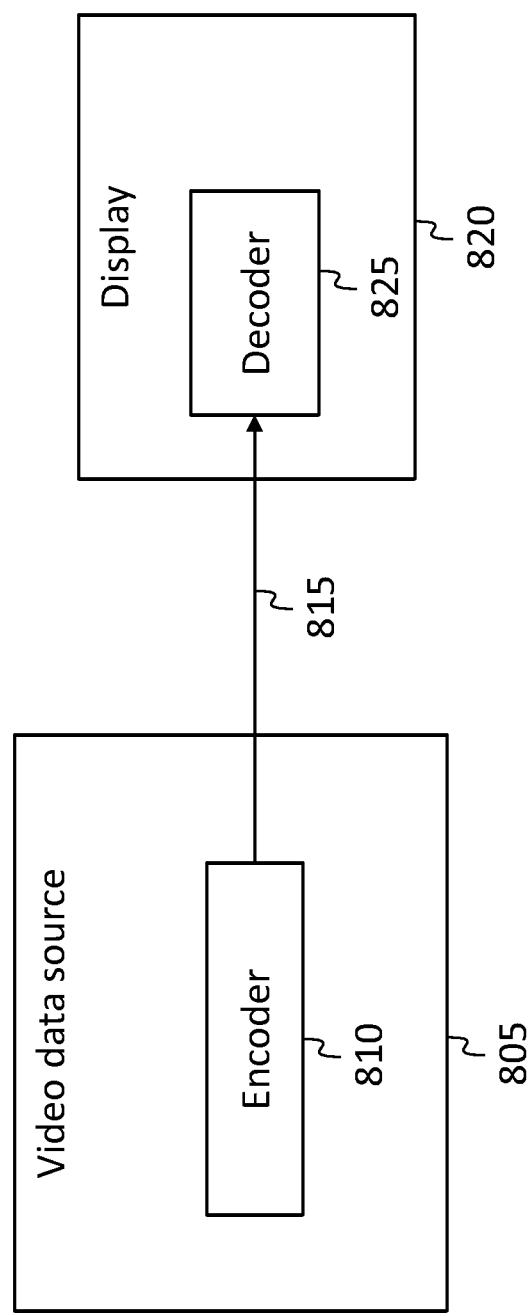
FIG. 8 is a block diagram of a video system, according to an embodiment of the present invention.

Referring to FIG. 8, in some embodiments a video data source 805 (e.g., a video card) includes an encoder 810 according to an embodiment of the present invention, for compressing the display stream conveying data through a transmission channel 815 to a display 820. The display 820 includes a decoder 825 for recovering video data, for display, that is similar or identical to the data generated by the video data source 805.

In view of the foregoing, embodiments of the present invention provide a system and method for compressing video data. When a triplet of data values corresponding to a pixel differs sufficiently little from a previous, reference triplet, the difference is encoded using one of several encoding functions selected according to which of several criteria of similarity between the current triplet and the reference triplet is met. When none of the available criteria of similarity is met, the triplet is instead encoded using differential pulse code modulation with non-uniform quantization.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" means a component constituting at least half, by weight, of a composition, and the term "major portion", when applied to a plurality of items, means at least half of the items.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for lightweight high quality image compression for display screens have been specifically described and illustrated herein, many modifications and variations will be apparent to those skilled in the art. Accordingly, it is to be understood that a system and method for lightweight high quality image compression for display screens constructed or practiced according to principles of this invention may be embodied other than as specifically described herein. The invention is also defined in the following claims, and equivalents thereof.

What is claimed is:

1. A method for transmitting a sequence of triplets of raw data units corresponding to a sequence of pixels, the method comprising:
   transmitting the raw data units of a first plurality of triplets, the first plurality of triplets comprising the L triplets nearest the beginning of the sequence of triplets, L being a positive integer; and
   encoding a second plurality of triplets comprising triplets following the L triplets nearest the beginning of the sequence of triplets, to form a plurality of encoded data units, each of the encoded data units corresponding to a respective triplet of the second plurality of triplets, wherein the encoding comprises:
      when any criterion of similarity, of a plurality of criteria of similarity, between:
         a current triplet of the second plurality of triplets and
         a reference triplet of the triplets preceding the current triplet is met:
            encoding the current triplet utilizing a difference function of the difference between the current triplet and the reference triplet, the difference function corresponding to the criterion of similarity, and
      otherwise:
         encoding a current triplet of the second plurality of triplets utilizing differential pulse code modulation with non-uniform quantization,
      wherein the non-uniform quantization is based on a quantizer mapping, from a plurality of input levels to a plurality of output levels, in which:
         a first set of input levels is the entire set of input levels corresponding to a first output level,
         a second set of input levels is the entire set of input levels corresponding to a second output level,
         a third set of input levels is the entire set of input levels corresponding to a third output level,
         the second output level is between the first output level and the third output level,
         the number of input levels in the first set of input levels is less than the number of input levels in the second set of input levels,
         the number of input levels in the third set of input levels is less than the number of input levels in the second set of input levels, and
      the output levels of the plurality of output levels are uniformly spaced.

2. The method of claim 1, wherein a criterion of similarity of a first family of criteria of similarity of the plurality of criteria of similarity is met when the reference triplet is a triplet preceding the current triplet by X positions in the sequence and the reference triplet consists of three raw data units each of which differs by no more than M from the corresponding raw data unit of the current triplet, X and M being positive integers.

3. The method of claim 2, wherein for a first criterion of similarity, of the first family of criteria of similarity, X=1 and M=4.

4. The method of claim 3, wherein:
   each of the current triplet and the reference triplet consists of a first data unit, a second data unit, and a third data unit, in the same respective order, and
   the difference function corresponding to the first criterion of similarity is:
      81 D1+9 D2+D3+O1, wherein:
         D1 is the difference between:
            the first data unit of the current triplet and
            the first data unit of the reference triplet,
         D2 is the difference between:
            the second data unit of the current triplet and
            the second data unit of the reference triplet,
         D3 is the difference between:
            the third data unit of the current triplet and
            the third data unit of the reference triplet, and
         O1 is an offset, O1 being a positive integer.

5. The method of claim 3, wherein for a second criterion of similarity, of the first family of criteria of similarity, X=2 and M=4.

6. The method of claim 5, wherein for a third criterion of similarity, of the first family of criteria of similarity, X=3 and M=1.

7. The method of claim 2, wherein a criterion of similarity of a second family of criteria of similarity of the plurality of criteria of similarity is met when the reference triplet is a triplet preceding the current triplet by Y positions in the sequence and the reference triplet consists of three raw data units one of which differs by no more than P from the corresponding raw data unit of the current triplet, and each of two of which is equal to the respective corresponding raw data unit of the current triplet, Y and P being positive integers.

8. The method of claim 7, wherein for a first criterion of similarity, of the second family of criteria of similarity, Y=5 and P=1.

9. The method of claim 7, wherein each Y is greater than each X.

10. The method of claim 2, wherein a criterion of similarity of a third family of criteria of similarity of the plurality of criteria of similarity is met when the reference triplet is a triplet preceding the current triplet by Z positions in the sequence and the reference triplet consists of three raw data units each of which is equal to the respective corresponding raw data unit of the current triplet, Z being a positive integer.

11. The method of claim 10, wherein each Z is greater than each Y.

12. The method of claim 10, wherein the encoding of a current triplet of the second plurality of triplets utilizing differential pulse code modulation with non-uniform quantization comprises:
encoding each raw data unit of the current triplet with a differential pulse code modulator comprising a non-uniform quantizer to form three resulting data units; and
combining the three resulting data units in an arithmetic encoder.

13. The method of claim 1, wherein the number of possible values resulting from any one of:
the encoding utilizing a difference function corresponding to one of the plurality of criteria of similarity, and
the utilizing differential pulse code modulation with non-uniform quantization
is at least 99% of the number of values in a codespace, the codespace including a number of values equal to a positive-integer power of two.

14. The method of claim 13, wherein the number of possible values resulting from any one of:
the encoding utilizing the difference function corresponding to one of the plurality of criteria of similarity, and
the utilizing of differential pulse code modulation with non-uniform quantization
equals the number of values in a codespace, the codespace including a number of values equal to a positive-integer power of two.

15. A system for transmitting a sequence of triplets of raw data units corresponding to a sequence of pixels, the system comprising a processing circuit configured to:
transmit the raw data units of a first plurality of triplets, the first plurality of triplets comprising the L triplets nearest the beginning of the sequence of triplets, L being a positive integer; and
encode a second plurality of triplets comprising triplets following the first L triplets, to form a plurality of encoded data units, each of the encoded data units corresponding to a respective triplet of the second plurality of triplets,
wherein the encoding comprises:
when any criterion of similarity, of a plurality of criteria of similarity, between:
a current triplet of the second plurality of triplets and
a reference triplet of the triplets preceding the current triplet is met:
encoding the current triplet utilizing a difference function of the difference between the current triplet and the reference triplet, the difference function corresponding to the criterion of similarity, and
otherwise:
encoding a current triplet of the second plurality of triplets utilizing differential pulse code modulation with non-uniform quantization,
wherein the non-uniform quantization is based on a quantizer mapping, from a plurality of input levels to a plurality of output levels, in which:
a first set of input levels is the entire set of input levels corresponding to a first output level,
a second set of input levels is the entire set of input levels corresponding to a second output level,
a third set of input levels is the entire set of input levels corresponding to a third output level,
the second output level is between the first output level and the third output level,
the number of input levels in the first set of input levels is less than the number of input levels in the second set of input levels,
the number of input levels in the third set of input levels is less than the number of input levels in the second set of input levels, and
the output levels of the plurality of output levels are uniformly spaced.

16. The system of claim 15, wherein a criterion of similarity of a first family of criteria of similarity of the plurality of criteria of similarity is met when the reference triplet is a triplet preceding the current triplet by X positions in the sequence and the reference triplet consists of three raw data units each of which differs by no more than M from the corresponding raw data unit of the current triplet, X and M being positive integers.

17. The system of claim 16, wherein a criterion of similarity of a second family of criteria of similarity of the plurality of criteria of similarity is met when the reference triplet is a triplet preceding the current triplet by Y positions in the sequence and the reference triplet consists of three raw data units one of which differs by no more than P from the corresponding raw data unit of the current triplet, and each of two of which is equal to the respective corresponding data unit of the current triplet, Y and P being positive integers.

18. The system of claim 17, wherein a criterion of similarity of a third family of criteria of similarity of the plurality of criteria of similarity is met when the reference triplet is a triplet preceding the current triplet by Z positions in the sequence and the reference triplet consists of three raw data units each of which is equal to the respective corresponding raw data unit of the current triplet, Z being a positive integer.

19. The system of claim 17, wherein the encoding of a current triplet of the second plurality of triplets utilizing differential pulse code modulation with non-uniform quantization comprises:
encoding each raw data unit of the current triplet with a differential pulse code modulator comprising a non-uniform quantizer to form three resulting data units; and
combining the three resulting data units in an arithmetic encoder.

20. A video system, comprising:
a video source; and
a display having an input connected to an output of the video source,
the video source comprising a processing circuit configured to:
transmit the raw data units of a first plurality of triplets, the first plurality of triplets comprising the L triplets nearest the beginning of the sequence of triplets, L being a positive integer; and encode a second plurality of triplets comprising triplets following the first L triplets, to form a plurality of encoded data units, each of the encoded data units corresponding to a respective triplet of the second plurality of triplets, wherein the encoding comprises:
when any criterion of similarity, of a plurality of criteria of similarity, between:
a current triplet of the second plurality of triplets and
a reference triplet of the triplets preceding the current triplet is met:
encoding the current triplet utilizing a difference function of the difference between the current triplet and the reference triplet, the difference function corresponding to the criterion of similarity, and
otherwise:
encoding a current triplet of the second plurality of triplets utilizing differential pulse code modulation with non-uniform quantization, wherein the non-uniform quantization is based on a quantizer mapping, from a plurality of input levels to a plurality of output levels, in which:
a first set of input levels is the entire set of input levels corresponding to a first output level,
a second set of input levels is the entire set of input levels corresponding to a second output level,
a third set of input levels is the entire set of input levels corresponding to a third output level,
the second output level is between the first output level and the third output level,
the number of input levels in the first set of input levels is less than the number of input levels in the second set of input levels,
the number of input levels in the third set of input levels is less than the number of input levels in the second set of input levels, and
the output levels of the plurality of output levels are uniformly spaced.

\* \* \* \* \*